(12) United States Patent
Mabuchi et al.

(10) Patent No.: US 9,822,245 B2
(45) Date of Patent: Nov. 21, 2017

(54) STUDLESS WINTER TIRE

(71) Applicant: SUMITOMO RUBBER INDUSTRIES, LTD., Kobe-shi, Hyogo (JP)

(72) Inventors: Takahiro Mabuchi, Kobe (JP); Kensuke Washizu, Kobe (JP); Toshifumi Haba, Kobe (JP); Kenya Watanabe, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 14/225,743

(22) Filed: Mar. 26, 2014

(65) Prior Publication Data
US 2014/0296373 A1 Oct. 2, 2014

(30) Foreign Application Priority Data

Mar. 27, 2013 (JP) ................................ 2013-066855
May 10, 2013 (JP) ................................ 2013-100481

(51) Int. Cl.
*C08L 9/00* (2006.01)
*C08L 7/00* (2006.01)
*B60C 1/00* (2006.01)
*C08L 47/00* (2006.01)

(52) U.S. Cl.
CPC .............. *C08L 9/00* (2013.01); *B60C 1/0016* (2013.01); *C08L 7/00* (2013.01); *C08L 47/00* (2013.01)

(58) Field of Classification Search
CPC ...... C08F 293/00; C08F 36/22; C08F 297/02; C08F 210/02; C08F 8/04; C08F 212/08; C08F 290/06; C09D 125/08; C08C 19/02; C09J 125/08; C08L 75/04; C08L 53/005; C08L 77/00; C08L 23/02; C08L 71/12; C08L 25/08; C08L 9/00; C08L 7/00; C08L 47/00; B60C 1/0016
USPC ........................................................ 523/156
See application file for complete search history.

(56) References Cited

U.S. PATENT DOCUMENTS

| | | | |
|---|---|---|---|
| 5,352,743 A | 10/1994 | Coolbaugh et al. | |
| 5,851,321 A † | 12/1998 | Midorikawa | |
| 7,411,018 B2 | 8/2008 | Appel et al. | |
| 7,655,739 B1 | 2/2010 | McPhee et al. | |
| 7,759,444 B1 | 7/2010 | McPhee | |
| 2007/0078232 A1 | 4/2007 | Yan | |
| 2007/0149689 A1 | 6/2007 | Wang et al. | |
| 2008/0161452 A1 | 7/2008 | York et al. | |
| 2009/0105398 A1 | 4/2009 | Hirabayashi | |
| 2010/0056685 A1* | 3/2010 | Hattori et al. ................. 524/396 |
| 2010/0056714 A1 | 3/2010 | McPhee | |
| 2010/0056743 A1* | 3/2010 | McPhee ......................... 526/346 |
| 2012/0259038 A1 | 10/2012 | Kojima | |
| 2014/0155536 A1 | 6/2014 | Kuwahara et al. | |
| 2014/0213715 A1* | 7/2014 | Kuwahara ................. B60C 1/00 524/496 |
| 2014/0296373 A1 | 10/2014 | Mabuchi et al. | |
| 2014/0357824 A1* | 12/2014 | Washizu ............... B60C 1/0016 526/336 |
| 2014/0371415 A1 | 12/2014 | Washizu | |
| 2015/0031839 A1* | 1/2015 | Washizu ............... B60C 1/0016 525/332.8 |
| 2015/0051332 A1* | 2/2015 | Koda ...................... C08L 21/00 524/493 |
| 2015/0057392 A1* | 2/2015 | Koda ....................... B60C 1/00 523/156 |
| 2015/0057403 A1 | 2/2015 | Koda et al. | |

FOREIGN PATENT DOCUMENTS

| | | |
|---|---|---|
| CN | 101665061 A | 3/2010 |
| CN | 102164974 A | 8/2011 |
| EP | 1069160 † | 1/2001 |
| EP | 1 099 711 A2 | 5/2001 |
| EP | 2014709 † | 1/2009 |
| EP | 2 835 387 A1 | 2/2015 |
| JP | 2000-344955 A | 12/2000 |
| JP | 2003-64222 A | 3/2003 |
| JP | 2011094013 † | 5/2011 |
| JP | 2012-502135 A | 1/2012 |
| JP | 2012-502136 A | 1/2012 |
| JP | 2014-88544 A | 5/2014 |
| JP | 2014-208796 A | 11/2014 |
| JP | 2014-218631 A | 11/2014 |
| WO | 2010027464 † | 3/2010 |
| WO | WO 2010/027463 A1 | 3/2010 |
| WO | WO 2010/027464 A1 | 3/2010 |

(Continued)

OTHER PUBLICATIONS

"Characterization of an ultrahighmolecular polymethacrylate with a liquid crystalline side group in a dilute solution," Berlin, 2000.

(Continued)

Primary Examiner — Alexander Kollias
(74) Attorney, Agent, or Firm — Birch, Stewart, Kolasch & Birch, LLP

(57) ABSTRACT

Provided is a studless winter tire which provides good performance on ice and snow and good abrasion resistance, and suffers little change in hardness and little discoloration on the tire surface. The present invention relates to a studless winter tire including a tread formed from a rubber composition containing a predetermined amount of a farnesene resin obtained by polymerizing farnesene. The present invention relates to a studless winter tire including a tread formed from a rubber composition containing a predetermined amount of at least one myrcene resin selected from the group consisting of myrcene polymers with a Mw of 1,000-500,000, myrcene-butadiene copolymers with a Mw of 1,000-500,000, and myrcene-styrene copolymers with a Mw of 1,000-150,000; and a predetermined amount of a silica with an $N_2SA$ of 40-400 $m^2/g$, the rubber component containing a predetermined amount of a high-cis polybutadiene with a cis content of 95% by mass or more.

13 Claims, No Drawings

(56) References Cited

FOREIGN PATENT DOCUMENTS

| WO | 2013047347 | † | 4/2013 |
| WO | 2013047348 | † | 4/2013 |
| WO | WO 2013/115010 A1 | | 8/2013 |
| WO | WO 2013/115011 A1 | | 8/2013 |
| WO | WO 2013/125496 A1 | | 8/2013 |
| WO | 2013151067 | † | 10/2013 |
| WO | 2013151068 | † | 10/2013 |
| WO | WO 2013/151069 A1 | | 10/2013 |

OTHER PUBLICATIONS

International Search Report (form PCT/ISA/210), dated Oct. 28, 2014, for International Application No. PCT/JP2014/072109.
Evonik Indus. AG (Apr. 2014), Aerosil 300 [product information], Evonik Indus. AG, Hanau-Wolfgang, Germany, 2 pages.†
Evonik Indus. AG (Sep. 2014), Ultrasil 7000 GR [product information], Evonik Indus. AG, Hanau-Wolfgang, Germany, 2 pages.†
Kuraray Co., Ltd. (Jan. 2014), Kuraray Liquid Rubber [product pamphlet], Kuraray Co., Ltd., Tokyo, Japan, 7 pages.†
Hayashi et al., Development and Foresight of Solution SBR for Energy-Saving Tires, Sumitomo Chemical R&D Report, vol. 2011-I(2011), 10 pages.http://www.sumitomo-chem.co.jp/.†

\* cited by examiner
† cited by third party

STUDLESS WINTER TIRE

TECHNICAL FIELD

The present invention relates to a studless winter tire.

BACKGROUND ART

The use of studded tires has been prohibited by law for the purpose of preventing dust pollution by studded tires. This has led to use of studless winter tires in place of studded tires in cold regions.

For improved grip performance on ice and snow of such studless winter tires, a method is known in which the hardness of a rubber used in a tire is reduced so as to reduce the elastic modulus (or modulus of elasticity) at low temperatures and thus enhance the adhesive friction. In particular, since the grip performance on ice is highly affected by the effective contact area between the rubber and ice, a flexible rubber is required for a larger effective contact area. However, rubbers lose their flexibility and become hard over time. This means that a flexible rubber obtained only by decreasing the hardness cannot maintain its good grip performance. Thus, there is still room for improvement in this respect.

Petroleum oil added to improve the flexibility of rubbers bleeds out from the compound, which leads to hardening of the compound with time, with the result that good performance on ice and snow cannot be maintained. Thus, there is also room for improvement in this respect. Further, the addition of petroleum oil tends to decrease the abrasion resistance. Thus, there is further room for improvement in this respect.

Recent serious consideration of global environmental issues has led to development of some novel oil alternatives to petroleum oil. For example, Patent Literature 1 discloses rubber compositions containing a vegetable oil or fat such as palm oil. However, although such vegetable oil and fat is better from the viewpoint of environmental friendliness, it is inferior to petroleum oil such as aromatic oil in the dispersibility of filler. Thus, there is further room for improvement in this respect.

Meanwhile, tires are known to deteriorate by heat generated during driving, ozone and oxygen in the air, ultraviolet rays, and the like. In recent years, there has been an increasing trend in ozone levels because of, for example, industrialization. Thus, rubbers are required to have much better ozone resistance to prevent their deterioration and thus provide a longer life to tires.

In order to improve the ozone resistance, a method is known in which an antioxidant, wax or the like is added. In this method, however, such antioxidant and wax will migrate to the tire surface to discolor the surface, resulting in poor appearance. Such deterioration in appearance can be a disadvantage especially for side walls. Further, it can also be a disadvantage for treads of vehicles that are not driven often and the like.

CITATION LIST

Patent Literature

Patent Literature 1: JP 2003-64222 A

SUMMARY OF INVENTION

Technical Problem

The present invention aims to provide a studless winter tire which solves the above problems and which has good performance on ice and snow and good abrasion resistance, and suffers little change in hardness and little discoloration on the tire surface.

Solution to Problem

A first aspect of the present invention relates to a studless winter tire, including a tread formed from a rubber composition, the rubber composition including, per 100 parts by mass of a rubber component, 1 to 50 parts by mass of a farnesene resin obtained by polymerizing farnesene.

In the first aspect of the present invention, the farnesene resin is preferably a polymer of farnesene.

In the first aspect of the present invention, the polymer preferably has a glass transition temperature of −60° C. or lower.

In the first aspect of the present invention, the polymer preferably has a weight average molecular weight of 3,000 to 500,000.

In the first aspect of the present invention, the farnesene resin is preferably a copolymer of farnesene and a vinyl monomer.

In the first aspect of the present invention, the vinyl monomer is preferably styrene.

In the first aspect of the present invention, the vinyl monomer is preferably butadiene.

In the first aspect of the present invention, the copolymer preferably has a farnesene/vinyl monomer copolymerization ratio of 99/1 to 25/75 by mass.

In the first aspect of the present invention, the copolymer preferably has a weight average molecular weight of 3,000 to 500,000.

In the first aspect of the present invention, the copolymer preferably has a melt viscosity at 38° C. of 1,000 Pa·s or lower.

In the first aspect of the present invention, the farnesene is preferably prepared by culturing a microorganism using a carbon source derived from a saccharide.

The studless winter tire of the first aspect of the present invention preferably includes, per 100 parts by mass of the rubber component, 10 to 150 parts by mass of a silica having a nitrogen adsorption specific surface area of 40 to 400 $m^2/g$.

In the first aspect of the present invention, the rubber component preferably includes, based on 100% by mass of the rubber component, 15 to 65% by mass of a high-cis polybutadiene having a cis-content of 95% by mass or more.

A second aspect of the present invention relates to a studless winter tire, including a tread formed from a rubber composition, the rubber composition including, per 100 parts by mass of a rubber component: 1 to 50 parts by mass of at least one myrcene resin selected from the group consisting of myrcene polymers having a weight average molecular weight of 1,000 to 500,000, myrcene-butadiene copolymers having a weight average molecular weight of 1,000 to 500,000, and myrcene-styrene copolymers having a weight average molecular weight of 1,000 to 150,000; and 10 to 150 parts by mass of a silica having a nitrogen adsorption specific surface area of 40 to 400 $m^2/g$, and the rubber component including, based on 100% by mass of the rubber component, 15 to 65% by mass of a high-cis polybutadiene having a cis content of 95% by mass or more.

Advantageous Effects of Invention

Since the first aspect of the present invention relates to a studless winter tire including a tread formed from a rubber composition containing a predetermined amount of a farnesene resin obtained by polymerizing farnesene, it provides a studless winter tire which has good performance on ice and snow (good grip and steering performances on ice and snow) and good abrasion resistance, and suffers little change in hardness and little discoloration on the tire surface.

Since the second aspect of the present invention relates to a studless winter tire including a tread formed from a rubber composition containing predetermined amounts of a specific myrcene resin having a weight average molecular weight within a predetermined range, a high-cis polybutadiene having a cis content within a predetermined range, and a silica having a nitrogen adsorption specific surface area within a predetermined range, it provides a studless winter tire which has good performance on ice and snow (good grip and steering performances on ice and snow) and good abrasion resistance, and suffers little change in hardness and little discoloration on the tire surface.

DESCRIPTION OF EMBODIMENTS

<First Aspect of the Present Invention>

The rubber composition according to the first aspect of the present invention contains a predetermined amount of a farnesene resin obtained by polymerizing farnesene. The addition of the farnesene resin as a softening agent improves the performance on ice and snow and the steering performance, and, at the same time, suppresses changes in hardness over time, as compared with when oil is used. Further, the use of the farnesene resin prevents blooming of oil, antioxidants, and wax; therefore, discoloration (turning white or brown) on the rubber surface can be suppressed even when oil, an antioxidant or wax is used.

The rubber component in the rubber composition according to the first aspect of the present invention is not particularly limited. Examples thereof include those commonly used in the tire industry, such as natural rubber (NR), isoprene rubber (IR), butadiene rubber (BR), styrene-butadiene rubber (SBR), butadiene-isoprene copolymer rubber, and butyl rubber. Preferred among these are NR and BR, and more preferred is a combination of NR and BR. The use of NR and BR provides good performance on ice and snow and good abrasion resistance. Moreover, co-curing of a farnesene resin with NR and BR prevents blooming of the farnesene resin and accompanying blooming of oil, antioxidants, and wax. This further suppresses discoloration on the rubber surface.

The BR used may suitably be a high-cis polybutadiene (high-cis butadiene rubber) having a cis content of 95% by mass or more (preferably 97% by mass or more). Examples of high-cis polybutadienes include those commonly used in the tire industry, such as BR1220 (ZEON Corp.), and BR130B and BR150B (both available from Ube Industries, Ltd.).

The cis content values herein are calculated based on infrared absorption spectrum analysis.

The amount of BR based on 100% by mass of the rubber component is preferably 15% by mass or more, more preferably 25% by mass or more, and still more preferably 30% by mass or more. With less than 15% by mass of BR, the performance on ice and snow and the abrasion resistance tend to be poor. The amount of BR is preferably 65% by mass or less, and more preferably 60% by mass or less. Although more than 65% by mass of BR provides good grip performance on ice and good abrasion resistance, it tends to lead to deterioration in steering performance and wet grip performance.

The NR used is not particularly limited, and any of those commonly used in the tire industry may be used.

In order to provide the effects of the first aspect of the present invention well, the amount of NR based on 100% by mass of the rubber component is preferably 35% by mass or more, and more preferably 40% by mass or more, whereas it is preferably 85% by mass or less, more preferably 75% by mass or less, and still more preferably 70% by mass or less.

The rubber composition according to the first aspect of the present invention contains a farnesene resin. The farnesene resin refers to a polymer obtained by polymerizing farnesene as a monomer. The farnesene exists in isomer forms, such as α-farnesene ((3E,7E)-3,7,11-trimethyl-1,3,6,10-dodecatetraene) and β-farnesene (7,11-dimethyl-3-methylene-1,6,10-dodecatriene). It is preferably (E)-β-farnesene having the following structure:

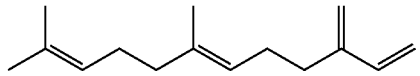

The farnesene resin is preferably used in place of a conventional softening agent such as oil. In this case, the effects of the first aspect of the present invention can be more suitably achieved.

The farnesene resin may be a polymer of farnesene (farnesene polymer) or may be a copolymer of farnesene and a vinyl monomer (farnesene/vinyl monomer copolymer). Examples of vinyl monomers include aromatic vinyl compounds such as styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene, and tertiary amino group-containing diphenylethylene, and conjugated diene compounds such as butadiene and isoprene. Preferred among these are styrene and butadiene. In other words, the farnesene/vinyl monomer copolymer is preferably a copolymer of farnesene and styrene (farnesene/styrene copolymer) or a copolymer of farnesene and butadiene (farnesene/butadiene copolymer). The use of a farnesene/styrene copolymer enhances the effect of improving the steering performance. The use of a farnesene/butadiene copolymer enhances the effect of improving the performance on ice and snow and abrasion resistance.

The glass transition temperature (Tg) of the farnesene polymer is preferably −60° C. or lower, and more preferably −70° C. or lower, whereas it is preferably −120° C. or higher, and more preferably −110° C. or higher. A farnesene polymer with a glass transition temperature within the range mentioned above can be suitably used as a softening agent for tires.

For the same reason, the Tg value of the farnesene/styrene copolymer is preferably −15° C. or lower, and more preferably −30° C. or lower, whereas it is preferably −80° C. or higher, and more preferably −70° C. or higher.

For the same reason, the Tg value of the farnesene/butadiene copolymer is preferably −60° C. or lower, and more preferably −70° C. or lower, whereas it is preferably −120° C. or higher, and more preferably −110° C. or higher.

Tg values are measured using a differential scanning calorimeter (Q200, TA Instruments Japan) at a temperature increase rate of 10° C./min in conformity with JIS-K7121: 1987.

The weight average molecular weight (Mw) of the farnesene polymer is preferably 3,000 or higher, more preferably 5,000 or higher, and still more preferably 8,000 or higher. With a farnesene polymer with a Mw of lower than 3,000, the steering performance and the abrasion resistance tend to be poor. The Mw of the farnesene polymer is preferably 500,000 or lower, more preferably 300,000 or lower, and still more preferably 150,000 or lower. A farnesene polymer with a Mw exceeding 500,000 tends to deteriorate the grip performance on ice.

For the same reason, the Mw of the farnesene/vinyl monomer copolymer is preferably 3,000 or higher, more preferably 5,000 or higher, and still more preferably 8,000 or higher, whereas it is preferably 500,000 or lower, more preferably 300,000 or lower, still more preferably 150,000 or lower, and particularly preferably 100,000 or lower.

Farnesene polymers and farnesene/vinyl monomer copolymers having a Mw within the ranges mentioned above are in the liquid state at room temperature, and can be suitably used as softening agents for tires.

The melt viscosity of the farnesene polymer is preferably 1,000 Pa·s or lower, and more preferably 200 Pa·s or lower, whereas it is preferably 0.1 Pa·s or higher, and more preferably 0.5 Pa·s or higher. A farnesene polymer with a melt viscosity within the range mentioned above can be suitably used as a softening agent for tires, and is excellent in bloom resistance.

For the same reason, the melt viscosity of the farnesene/vinyl monomer copolymer is preferably 1000 Pa·s or lower, more preferably 650 Pa·s or lower, and still more preferably 200 Pa·s or lower, whereas it is preferably 1 Pa·s or higher, and more preferably 5 Pa·s or higher.

Melt viscosity values are measured using a Brookfield-type viscometer (BROOKFIELD ENGINEERING LABS. INC.) at 38° C.

The farnesene polymer preferably has a farnesene content of 80% by mass or more, more preferably 90% by mass or more, based on 100% by mass of total monomer. The farnesene content may be 100% by mass.

The farnesene/vinyl monomer copolymer preferably has a combined content of farnesene and vinyl monomer of 80% by mass or more, more preferably 90% by mass or more, based on 100% by mass of total monomer. The combined content may be 100% by mass. The farnesene/vinyl monomer copolymerization ratio (farnesene/vinyl monomer) is preferably 99/1 to 25/75, and more preferably 80/20 to 40/60 by mass.

The farnesene resin may be synthesized by a known technique. In the case of anion polymerization synthesis, for example, a sufficiently nitrogen-purged pressure-resistant container is charged with hexane, farnesene, sec-butyllithium, and optionally a vinyl monomer; the mixture is warmed and stirred for several hours; and the resulting polymerization solution is quenched and then dried in vacuo, thereby providing a liquid farnesene resin.

The procedure for polymerization in the preparation of the farnesene polymer is not particularly limited. For example, all the monomers may be polymerized simultaneously, or the monomers may be added sequentially and polymerized. The procedure for copolymerization in the preparation of the farnesene/vinyl monomer copolymer is also not particularly limited. For example, all the monomers may be random-polymerized simultaneously; some monomer(s) (for example, farnesene monomer alone, or butadiene monomer alone) may be previously copolymerized before the remaining monomer(s) are added and copolymerized therewith; or each particular monomer may be previously polymerized before the resulting polymers are block-copolymerized.

The farnesene used in the farnesene resin may be prepared by chemical synthesis from petroleum resources, or may be extracted from insects such as Aphididae or plants such as apples. It is preferably prepared by culturing a microorganism using a carbon source derived from a saccharide. The farnesene resin can be efficiently prepared from such farnesene.

The saccharide used may be any of monosaccharides, disaccharides, and polysaccharides, or may be a combination thereof. Examples of monosaccharides include glucose, galactose, mannose, fructose, and ribose. Examples of disaccharides include sucrose, lactose, maltose, trehalose, and cellobiose. Examples of polysaccharides include starch, glycogen, cellulose, and chitin.

Saccharides suitable for preparing farnesene are obtainable from a wide variety of materials, such as sugar cane, bagasse, Miscanthus, sugar beet, sorghum, grain sorghum, switchgrass, barley, hemp, kenaf, potato, sweet potato, cassaya, sunflower, fruits, molasses, whey, skim milk, corn, straw, grain, wheat, wood, paper, wheat straw, and cotton. In addition, cellulosic wastes and other biomass materials may also be used. Preferred among these are plants of genus *Saccharum*, such as sugar cane (*Saccharum officinarum*), and more preferred is sugar cane.

The microorganism used may be any microorganism capable of producing farnesene through culturing. Examples thereof include eukaryotes, bacteria, and archaebacteria. Examples of eukaryotes include yeast and plants.

The microorganism may be a transformant. The transformant is obtainable by introducing a foreign gene into a host microorganism. The foreign gene is not particularly limited, and it is preferably a foreign gene involved in the production of farnesene because it can improve the efficiency of producing farnesene.

The conditions for culturing the microorganism are not particularly limited as long as they allow the microorganism to produce farnesene. The medium used for culturing the microorganism may be any medium commonly used for culturing microorganisms. Specific examples thereof include, in the case of bacteria, KB medium and LB medium; in the case of yeast, YM medium, KY medium, F101 medium, YPD medium, and YPAD medium; and in the case of plants, basal media such as White medium, Heller medium, SH medium (Schenk and Hildebrandt medium), MS medium (Murashige and Skoog medium), LS medium (Linsmaier and Skoog medium), Gamborg medium, B5 medium, MB medium, and WP medium (for woody plants).

The culture temperature depends on the type of the microorganism. It is preferably 0° C. to 50° C., more preferably 10° C. to 40° C., and still more preferably 20° C. to 35° C. The pH is preferably 3 to 11, more preferably 4 to 10, and still more preferably 5 to 9. The microorganism may be cultured either anaerobically or aerobically depending on its type.

The microorganism may be cultured in a batch process, or in a continuous process using a bioreactor. Specific examples of the culturing method include shaking culture and rotary culture. Farnesene may be accumulated in the cells of the microorganism, or may be produced and accumulated in the culture supernatant.

In the case of recovering farnesene from the cultured microorganism, the microorganism may be collected by centrifugation and disrupted, and then farnesene can be extracted from the disrupted solution with a solvent such as 1-butanol. Such solvent extraction may appropriately be combined with any known purification process such as chromatography. The microorganism is preferably disrupted at a low temperature, for example, at 4° C., in order to prevent modification and breakdown of farnesene. The microorganism may be physically disrupted using glass beads, for example.

In the case of recovering farnesene from the culture supernatant, the culture may be centrifuged to remove the cells, and then farnesene can be extracted from the resulting supernatant with a solvent such as 1-butanol.

The farnesene resin formed from the aforementioned microorganism-derived farnesene is available from the market, and examples of such farnesene polymers include KB-101 and KB-107 (both available from KURARAY CO., LTD.). Examples of such farnesene/styrene copolymers include FSR-221, FSR-242, FSR-251, and FSR-262 (all available from KURARAY CO., LTD.). Examples of such farnesene/butadiene copolymers include FBR-746, FB-823, and FB-884 (all available from KURARAY CO., LTD.).

The amount of the farnesene resin per 100 parts by mass of the rubber component is 1 part by mass or more, preferably 3 parts by mass or more, and more preferably 5 parts by mass or more. Less than 1 part by mass of the farnesene resin tends not to sufficiently provide the effects of improving the performance on ice and snow and the abrasion resistance and the effects of suppressing changes in hardness and discoloration on the tire surface. The amount of the farnesene resin is 50 parts by mass or less, preferably 40 parts by mass or less, and more preferably 30 parts by mass or less. More than 50 parts by mass of the farnesene resin tends to deteriorate the steering performance and abrasion resistance.

The rubber composition according to the first aspect of the present invention preferably contains silica. The use of silica in combination with the farnesene resin leads to formation of a farnesene resin coating around the surface of silica, which prevents blooming of the farnesene resin. Further, the farnesene resin allows silica to disperse well. The silica used is not particularly limited, and examples thereof include dry silica (anhydrous silica) and wet silica (hydrous silica). Preferred is wet silica because it has more silanol groups. These silicas may be used alone, or two or more of these may be used in combination.

The silica preferably has a nitrogen adsorption specific surface area ($N_2SA$) of 40 $m^2/g$ or greater, more preferably 50 $m^2/g$ or greater, and still more preferably 60 $m^2/g$ or greater. A silica with an $N_2SA$ of smaller than 40 $m^2/g$ tends to have a small reinforcing effect, providing poor abrasion resistance. The nitrogen adsorption specific surface area ($N_2SA$) of silica is preferably 400 $m^2/g$ or smaller, more preferably 360 $m^2/g$ or smaller, and still more preferably 300 $m^2/g$ or smaller. A silica with an $N_2SA$ of greater than 400 $m^2/g$ tends to be less dispersible and thus deteriorate the processability.

The nitrogen adsorption specific surface area values of silica are determined by the BET method in conformity with ASTM D3037-81.

The amount of silica per 100 parts by mass of the rubber component is preferably 10 parts by mass or more, more preferably 30 parts by mass or more, and still more preferably 45 parts by mass or more. Less than 10 parts by mass of silica tends to insufficiently exert its effect, resulting in poor steering performance and poor abrasion resistance, as well as great changes in hardness. The amount of silica is preferably 150 parts by mass or less, and more preferably 100 parts by mass or less. More than 150 parts by mass of silica tends to deteriorate the performance on ice and snow greatly, and to cause great changes in hardness.

The silica may be used in combination with a silane coupling agent. Examples of silane coupling agents include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazoletetrasulfide, 3-triethoxysilylpropylbenzothiazolyltetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, and dimethoxymethylsilylpropylbenzothiazoletetrasulfide. In terms of the reinforcement-improving effect and the like, preferred among these are bis(3-triethoxysilylpropyl)tetrasulfide and 3-trimethoxysilylpropylbenzothiazolyltetrasulfide. These silane coupling agents may be used alone, or two or more of these may be used in combination.

The amount of silane coupling agent per 100 parts by mass of silica is preferably 1 part by mass or more, and more preferably 2 parts by mass or more. With less than 1 part by mass of silane coupling agent, the unvulcanized rubber composition tends to have a high viscosity and therefore poor processability. The amount of silane coupling agent is preferably 20 parts by mass or less, and more preferably 15 parts by mass or less. More than 20 parts by mass of silane coupling agent tends to fail to produce an effect proportional to the increase in the cost.

Any known additives may be used, including vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides; fillers such as carbon black, calcium carbonate, talc, alumina, clay, aluminum hydroxide, and mica; softening agents such as oils; and antioxidants.

Examples of carbon black include furnace black (furnace carbon black) such as SAF, ISAF, HAF, MAF, FEF, SRF, GPF, APF, FF, CF, SCF, and ECF; acetylene black (acetylene carbon black); thermal black (thermal carbon black) such as FT and MT; channel black (channel carbon black) such as EPC, MPC, and CC; and graphite. These may be used alone, or two or more of these may be used in combination.

The nitrogen adsorption specific surface area ($N_2SA$) of carbon black is typically 5 to 200 $m^2/g$. Preferably, the lower limit thereof is 50 $m^2/g$, whereas the upper limit thereof is 150 $m^2/g$. The dibutyl phthalate (DBP) absorption number of carbon black is typically 5 to 300 ml/100 g. Preferably, the lower limit thereof is 80 ml/100 g, whereas the upper limit thereof is 180 ml/100 g. A carbon black with an $N_2SA$ or DBP absorption number lower than the lower limit of the range mentioned above tends to have a small reinforcing effect, providing reduced abrasion resistance. A carbon black with an $N_2SA$ or DBP absorption number higher than the upper limit of the range mentioned above tends to have poor dispersibility. The nitrogen adsorption specific surface area is determined in conformity with ASTM D4820-93. The DBP absorption number is determined in conformity with ASTM D2414-93. Examples of commercially available products of carbon black include SEAST 6, SEAST 7HM, and SEAST KH (all available from TOKAI CARBON CO., LTD.), CK3 and Special Black 4A (both available from Degussa), and DIABLACK N339 (available from Mitsubishi Chemical Corp.).

The amount of carbon black per 100 parts by mass of the rubber component is preferably 1 part by mass or more, and more preferably 3 parts by mass or more. Less than 1 part by mass of carbon black may fail to provide sufficient reinforcement. The amount of carbon black is preferably 60 parts by mass or less, more preferably 30 parts by mass or less, and still more preferably 15 parts by mass or less. More than 60 parts by mass of carbon black tends to make the rubber too hard, deteriorating the grip performance.

Examples of oil include aromatic oil (viscosity-gravity constant (VGC value): 0.900 to 1.049), naphthenic oil (VGC value: 0.850 to 0.899), and paraffinic oil (VGC value: 0.790 to 0.849). Two or more of these may be used as a mixture, if desired.

As mentioned above, the farnesene resin is preferably substituted for part or all of the components conventionally added as the softening agent, such as oil. The amount of the farnesene resin based on 100% by mass of total softening agent is preferably 5% by mass or more, more preferably 10% by mass or more, and still more preferably 15% by mass or more. The upper limit thereof may be 100% by mass, and it is preferably 80% by mass or less, and more preferably 50% by mass or less. The total amount of softening agent (including the farnesene resin) per 100 parts by mass of the rubber component is preferably 1 to 100 parts by mass, more preferably 10 to 80 parts by mass, and still more preferably 20 to 60 parts by mass.

Examples of vulcanization accelerators include thiazole vulcanization accelerators such as 2-mercaptobenzothiazole, dibenzothiazyldisulfide, and N-cyclohexyl-2-benzothiazylsulfenamide; thiuram vulcanization accelerators such as tetramethylthiuram monosulfide and tetramethylthiuram disulfide; sulfonamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. The amount thereof per 100 parts by mass of the rubber component is preferably 0.1 to 5 parts by mass, and more preferably 0.2 to 3 parts by mass.

The rubber composition according to the first aspect of the present invention may be prepared by any known method; for example, the components are kneaded using a known mixer such as an open roll mill or a Banbury mixer.

Regarding the conditions for kneading additives other than vulcanizing agents and vulcanization accelerators, the kneading temperature is typically 50° C. to 200° C., preferably 80° C. to 190° C., and the kneading time is typically 30 seconds to 30 minutes, preferably 1 to 30 minutes.

For kneading vulcanizing agents and vulcanization accelerators, the kneading temperature is typically 100° C. or lower, and preferably ranges from room temperature to 80° C. A composition containing a vulcanizing agent and/or a vulcanization accelerator is typically vulcanized (e.g. press-vulcanized) before use. The vulcanization temperature is typically 120° C. to 200° C., preferably 140° C. to 180° C.

The rubber composition according to the first aspect of the present invention is used in a tread (cap tread) of a studless winter tire.

The studless winter tire of the first aspect of the present invention can be prepared using the above rubber composition by an ordinary process. Specifically, the rubber composition containing additives as appropriate, before vulcanization, is extruded into a tread shape, formed on a tire building machine in a usual manner, and assembled with other tire components to build an unvulcanized tire. This unvulcanized tire is heat-pressed in a vulcanizer, thereby producing a studless winter tire of the first aspect of the present invention.

<Second Aspect of the Present Invention>

The rubber composition according to the second aspect of the present invention contains predetermined amounts of a specific myrcene resin having a weight average molecular weight within a predetermined range, a high-cis polybutadiene having a cis-content within a predetermined range, and a silica having a nitrogen adsorption specific surface area within a predetermined range. The use of the myrcene resin as a softening agent improves the performance on ice and snow and the steering performance, and also suppresses changes in hardness over time, as compared with when oil is used. Further, a coating of the myrcene resin is formed around the surface of silica, and the myrcene resin is co-cured with rubber ingredients such as natural rubber and polybutadiene. These prevent blooming of the myrcene resin and accompanying blooming of antioxidants and wax. Thus, discoloration (turning white or brown) on the rubber surface can be suppressed even when oil, an antioxidant or wax is used.

The rubber component in the rubber composition according to the second aspect of the present invention contains a high-cis polybutadiene (high-cis butadiene rubber) having a cis content of 95% by mass or more (preferably 97% by mass or more). The high-cis polybutadiene used is not particularly limited, and those commonly used in the tire industry may be used, such as BR1220 (available from ZEON Corp.), and BR130B and BR150B (both available from Ube Industries, Ltd.).

The cis content values herein are calculated based on infrared absorption spectrum analysis.

The amount of the high-cis polybutadiene based on 100% by mass of the rubber component is 15% by mass or more, preferably 25% by mass or more, and more preferably 30% by mass or more. With less than 15% by mass of the high-cis polybutadiene, the performance on ice and snow and the abrasion resistance tend to be poor. The amount of the high-cis polybutadiene is 65% by mass or less, preferably 60% by mass or less. More than 65% by mass of the high-cis polybutadiene tends to lead to deterioration in steering performance and wet grip performance, although it provides good performance on ice and snow and good abrasion resistance.

The rubber composition according to the second aspect of the present invention may contain other rubber ingredients in addition to the high-cis polybutadiene. Examples of other rubber ingredients include natural rubber (NR), polyisoprene rubber (IR), styrene-butadiene copolymer rubber (SBR), butadiene-isoprene copolymer rubber, and butyl rubber. NR, IR, and SBR are preferred among these, and NR is more preferred, in terms of providing the effects of the second aspect of the present invention well. The NR, IR, and SBR used are not particularly limited, and those commonly used in the tire industry may be used.

In order to provide the effects of the second aspect of the present invention well, the amount of NR based on 100% by mass of the rubber component is preferably 35% by mass or more, and more preferably 40% by mass or more, whereas it is preferably 85% by mass or less, more preferably 75% by mass or less, and still more preferably 70% by mass or less.

The rubber composition according to the second aspect of the present invention contains at least one myrcene resin selected from the group consisting of myrcene polymers, myrcene-butadiene copolymers, and myrcene-styrene copolymers which have the respective predetermined weight average molecular weights. The myrcene polymer refers to a polymer obtained by polymerizing myrcene as a monomer. The myrcene-butadiene copolymer refers to a copolymer obtained by polymerizing myrcene and butadiene as monomers. The myrcene-styrene copolymer refers to a copolymer obtained by polymerizing myrcene and styrene as monomers. The myrcene is an olefinic natural organic compound classified as a monoterpene. Myrcene exists in two isomer forms: α-myrcene (2-methyl-6-methyleneocta-1,7-diene) and β-myrcene (7-methyl-3-methyleneocta-1,6-diene). In the second aspect of the present invention, the term "myrcene" alone refers to β-myrcene (the compound having the following structure).

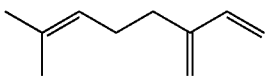

The rubber composition according to the second aspect of the present invention contains a myrcene resin having a predetermined weight average molecular weight and a silica having a predetermined nitrogen adsorption specific surface area in addition to the high-cis polybutadiene. This improves the performance on ice and snow and the steering performance, and also suppresses changes in hardness and discoloration on the rubber surface. The myrcene resin is preferably a myrcene-butadiene copolymer and/or a myrcene-styrene copolymer because they are more effective in improving the performance properties.

The myrcene resin is preferably used in place of a conventional softening agent such as oil. In this case, the effects of the second aspect of the present invention can be more suitably achieved.

The lower limit of the weight average molecular weight (Mw) of the myrcene polymer is not particularly limited as long as it is 1,000 or greater. It is preferably 2,000 or greater, and more preferably 3,000 or greater. With a myrcene polymer with a Mw of lower than 1,000, the steering performance and the abrasion resistance tend to be poor. The upper limit of the Mw of the myrcene polymer is not particularly limited as long as it is 500,000 or lower. It is preferably 300,000 or lower, more preferably 150,000 or lower, and particularly preferably 100,000 or lower. A myrcene polymer with a Mw of greater than 500,000 tends to deteriorate the performance on ice and snow. Myrcene polymers having a Mw within the range mentioned above are in the liquid state at room temperature, and thus can be suitably used as softening agents.

For the same reason, the weight average molecular weight (Mw) of the myrcene-butadiene copolymer is not particularly limited as long as it is 1,000 or greater, and it is preferably 2,000 or greater, and more preferably 3,000 or greater. The Mw of the myrcene-butadiene copolymer is not particularly limited as long as it is 500,000 or lower, and it is preferably 300,000 or lower, more preferably 150,000 or lower, and particularly preferably 100,000 or lower.

The weight average molecular weight (Mw) of the myrcene-styrene copolymer is not particularly limited as long as it is 1,000 or greater, and it is preferably 2,000 or greater, and more preferably 3,000 or greater. The Mw of the myrcene-styrene copolymer is not particularly limited as long as it is 150,000 or lower, and it is preferably 100,000 or lower, more preferably 50,000 or lower, and particularly preferably 30,000 or lower.

The weight average molecular weight (Mw) herein is determined by a method described in the section EXAMPLES.

The procedure for polymerization in the preparation of the myrcene resin is not particularly limited. For example, all the monomers may be polymerized simultaneously, or the monomers may be added sequentially and polymerized. Further, other monomer(s) than myrcene, butadiene, and styrene may be used in combination.

The myrcene polymer preferably has a myrcene content of 80% by mass or more, more preferably 90% by mass or more, based on 100% by mass of total monomer. The myrcene content may be 100% by mass.

The myrcene-butadiene copolymer preferably has a combined content of myrcene and butadiene of 80% by mass or more, more preferably 90% by mass or more, based on 100% by mass of total monomer. The combined content may be 100% by mass. The ratio by mass of myrcene to butadiene (myrcene/butadiene) is preferably 50/50 to 90/10, and more preferably 60/40 to 80/20.

The myrcene-styrene copolymer preferably has a combined content of myrcene and styrene of 80% by mass or more, more preferably 90% by mass or more, based on 100% by mass of total monomer. The combined content may be 100% by mass. The ratio by mass of myrcene to styrene (myrcene/styrene) is preferably 50/50 to 90/10, and more preferably 60/40 to 80/20.

The polymerization may be carried out by a conventional technique such as anionic polymerization or coordination polymerization.

Any polymerization process such as solution polymerization, emulsion polymerization, vapor phase polymerization, or bulk polymerization may be used. Preferred among these is solution polymerization. The polymerization may be carried out either in a batch or continuous mode.

The following will describe a method for preparing the myrcene resin by anionic polymerization and a method for preparing the myrcene polymer by coordination polymerization.

(Anionic Polymerization)

The anionic polymerization may be performed in an appropriate solvent in the presence of an anionic polymerization initiator. Any conventional anionic polymerization initiator may be suitably used. Examples of such anionic polymerization initiators include organic lithium compounds represented by the formula RLix wherein R is an aliphatic, aromatic or alicyclic group having one or more carbon atoms; and x is an integer of 1 to 20. Examples of suitable organic lithium compounds include methyllithium, ethyllithium, n-butyllithium, sec-butyllithium, tert-butyllithium, phenyllithium, and naphthyllithium. Preferred organic lithium compounds are n-butyllithium and sec-butyllithium. These anionic polymerization initiators may be used alone or two or more of these may be used in admixture. The polymerization initiator may be used in any amount in the anionic polymerization. For example, the amount thereof is preferably about 0.05-35 mmol, and more preferably about 0.05-0.2 mmol, per 100 g of total monomer used in the polymerization.

Any solvent that does not deactivate the anionic polymerization initiator and does not terminate the polymerization reaction may be suitably used in the anionic polymerization. Either of polar and non-polar solvents may be used. Examples of polar solvents include ether solvents such as tetrahydrofuran. Examples of non-polar solvents include acyclic hydrocarbons such as hexane, heptane, octane, and pentane; cyclic hydrocarbons such as cyclohexane; and aromatic hydrocarbons such as benzene, toluene, and xylene. These solvents may be used alone, or two or more of these may be used in admixture.

The anionic polymerization is preferably performed in the presence of a polar compound. Examples of such polar compounds include dimethyl ether, diethyl ether, ethyl methyl ether, ethyl propyl ether, tetrahydrofuran, dioxane, diphenyl ether, tripropylamine, tributylamine, trimethylamine, triethylamine, and N,N,N',N'-tetramethylethylenediamine (TMEDA). These polar compounds may be used alone, or two or more of these may be used in admixture. These polar compounds are useful in controlling the microstructure of a polymer. The amount of the polar compound varies depending on the type of the polar compound and the polymerization conditions, and the ratio by mole of the polar compound to the anionic polymerization initiator [(polar compound)/(anionic polymerization initiator)] is preferably 0.1 or higher. If the ratio by mole of the polar compound to the anionic polymerization initiator [(polar compound)/(anionic polymerization initiator)] is lower than 0.1, the polar material tends to have an insufficient effect in controlling the microstructure.

The reaction temperature during the anionic polymerization is not particularly limited as long as it allows the reaction to proceed suitably. In general, the reaction temperature is preferably $-10°$ C. to $100°$ C., and more preferably $25°$ C. to $70°$ C. Although the reaction time depends on the amounts of materials charged, the reaction temperature, and other conditions, about three hours of reaction, for example, is typically sufficient.

The anionic polymerization may be terminated by adding a reaction terminator commonly used in the art. Examples of such reaction terminators include polar solvents containing an active proton, such as alcohols (e.g. methanol, ethanol, and isopropanol) and acetic acid, and mixtures of these polar solvents, as well as mixtures of these polar solvents with non-polar solvents such as hexane and cyclohexane. Typically, it is sufficient to add the reaction terminator approximately in an equimolar or two-fold molar amount relative to the anionic polymerization initiator.

After termination of the polymerization reaction, the myrcene resin can be easily isolated by removing the solvent from the polymerization solution by a conventional method or by pouring the polymerization solution into a 1-fold or more amount of alcohol to precipitate the myrcene resin.
(Coordination Polymerization)

The coordination polymerization may be performed using a coordination polymerization initiator instead of the anionic polymerization initiator used in the anionic polymerization. Any conventional coordination polymerization initiator may be suitably used. Examples of such coordination polymerization initiators include catalysts which are transition metal-containing compounds such as lanthanoid compounds, titanium compounds, cobalt compounds, and nickel compounds. Here, an aluminum compound or boron compound may optionally be used as a promoter.

Any lanthanoid compound that contains any of the elements of atomic number from 57 to 71 (lanthanoids) may be used. Particularly preferred among these lanthanoids is neodymium. Examples of lanthanoid compounds include carboxylates, β-diketone complexes, alkoxides, phosphates or phosphites, and halides of these elements. Preferred among these are carboxylates, alkoxides, and β-diketone complexes, because of their easy handling. Examples of titanium compounds include titanium-containing compounds each of which has one cyclopentadienyl, indenyl, substituted cyclopentadienyl, or substituted indenyl group and also has three substituents selected from halogen atoms, alkoxy groups, and alkyl groups. Preferred are titanium-containing compounds having one alkoxysilyl group, in terms of catalytic performance. Examples of cobalt compounds include halides, carboxylates, β-diketone complexes, organic base complexes, and organic phosphine complexes of cobalt. Examples of nickel compounds include halides, carboxylates, β-diketone complexes, and organic base complexes of nickel. The catalysts that can be used as the coordination polymerization initiator may be used alone, or two or more of them may be used in combination. The catalyst as the polymerization initiator may be used in any amount in the coordination polymerization. The amount thereof is preferably as described for the amount of the catalyst used in the anionic polymerization.

Examples of aluminum compounds that can be used as the promoter include organic aluminoxanes, organoaluminum halides, organoaluminum compounds, and organoaluminum hydrides. Examples of organic aluminoxanes include alkylaluminoxanes (e.g. methylaluminoxane, ethylaluminoxane, propylaluminoxane, butylaluminoxane, isobutylaluminoxane, octylaluminoxane, and hexylaluminoxane). Examples of organoaluminum halides include alkylaluminum halides (e.g. dimethylaluminum chloride, diethylaluminum chloride, methylaluminum dichloride, and ethylaluminum dichloride). Examples of organoaluminum compounds include alkylaluminum compounds (e.g. trimethylaluminum, triethylaluminum, triisopropylaluminum, and triisobutylaluminum). Examples of organoaluminum hydrides include alkylaluminum hydrides (e.g. diethylaluminum hydride and diisobutylaluminum hydride). Examples of boron compounds include compounds containing anionic species, such as tetraphenylborate, tetrakis(pentafluorophenyl)borate, and (3,5-bistrifluoromethylphenyl)borate. Also, these promoters may be used alone or two or more of these may be used in combination.

The coordination polymerization may be performed using a solvent and a polar compound as mentioned for the anionic polymerization, in similar manners. The reaction time and the reaction temperature are as described for the anionic polymerization. The termination of the polymerization reaction and the isolation of the myrcene resin may also be performed in similar manners as described for the anionic polymerization.

The weight average molecular weight (Mw) of the myrcene resin can be controlled by adjusting the amount of monomer including myrcene and the amount of polymerization initiator charged in the polymerization. For example, an increase in the ratio of total monomer to anionic polymerization initiator or the ratio of total monomer to coordination polymerization initiator increases the Mw. Conversely, a decrease in such a ratio decreases the Mw. The number average molecular weight (Mn) of the myrcene polymer can also be controlled in a similar manner.

The amount of the myrcene resin per 100 parts by mass of the rubber component is 1 part by mass or more, preferably 3 parts by mass or more, and more preferably 5 parts by mass or more. Less than 1 part by mass of the myrcene resin tends not to sufficiently provide the effects of improving the performance on ice and snow and the abrasion resistance and the effects of suppressing changes in hardness and discoloration on the tire surface. The amount of the myrcene resin is 50 parts by mass or less, preferably 30 parts by mass or less, and more preferably 15 parts by mass or less. More than 50 parts by mass of the myrcene resin tends to deteriorate the steering performance and abrasion resistance.

The rubber composition according to the second aspect of the present invention contains a silica having a predetermined nitrogen adsorption specific surface area. The silica when used in combination with the high-cis polybutadiene and the myrcene resin is dispersible well. The silica used is not particularly limited, and examples thereof include dry silica (anhydrous silica) and wet silica (hydrous silica). Preferred is wet silica because it has more silanol groups. These silicas may be used alone, or two or more of these may be used in combination.

The nitrogen adsorption specific surface area ($N_2SA$) of the silica is 40 $m^2/g$ or greater, preferably 50 $m^2/g$ or greater, and more preferably 60 $m^2/g$ or greater. A silica with an $N_2SA$ of smaller than 40 $m^2/g$ tends to have a small reinforcing effect, providing poor abrasion resistance. The nitrogen adsorption specific surface area ($N_2SA$) of the silica is 400 $m^2/g$ or smaller, preferably 360 $m^2/g$ or smaller, and more preferably 300 $m^2/g$ or smaller. A silica with an $N_2SA$ of greater than 400 $m^2/g$ tends to be less dispersible and thus deteriorate the processability.

The nitrogen adsorption specific surface area values of the silica are determined by the BET method in accordance with ASTM D3037-81.

The amount of the silica per 100 parts by mass of the rubber component is 10 parts by mass or more, preferably 30 parts by mass or more, and more preferably 45 parts by mass or more. Less than 10 parts by mass of the silica tends to insufficiently exert its effect, resulting in poor steering performance and poor abrasion resistance, as well as greater changes in hardness. The amount of the silica is 150 parts by mass or less, preferably 100 parts by mass or less. More than 150 parts by mass of the silica tends to deteriorate the performance on ice and snow greatly, and to cause greater changes in hardness.

The silica may be used in combination with a silane coupling agent. Examples of silane coupling agents include those listed in the first aspect of the present invention. In terms of the reinforcement-improving effect and the like, preferred among these are bis(3-triethoxysilylpropyl)tetrasulfide and 3-trimethoxysilylpropylbenzothiazolyltetrasulfide. These silane coupling agents may be used alone, or two or more of these may be used in combination.

The amount of silane coupling agent per 100 parts by mass of silica is preferably 1 part by mass or more, and more preferably 2 parts by mass or more. With less than 1 part by mass of silane coupling agent, the unvulcanized rubber composition tends to have a high viscosity and therefore poor processability. The amount of silane coupling agent is preferably 20 parts by mass or less, and more preferably 15 parts by mass or less. More than 20 parts by mass of silane coupling agent tends to fail to produce an effect proportional to the increase in the cost.

Any known additives may be used, including vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides; fillers such as carbon black, calcium carbonate, talc, alumina, clay, aluminum hydroxide, and mica; softening agents such as oils; and antioxidants.

Examples of carbon black include those listed in the first aspect of the present invention. These may be used alone, or two or more of these may be used in combination.

The nitrogen adsorption specific surface area ($N_2SA$) of carbon black is typically 5 to 200 $m^2/g$. Preferably, the lower limit thereof is 50 $m^2/g$, whereas the upper limit thereof is 150 $m^2/g$. The dibutyl phthalate (DBP) absorption number of carbon black is typically 5 to 300 ml/100 g. Preferably, the lower limit thereof is 80 ml/100 g, whereas the upper limit thereof is 180 ml/100 g. A carbon black with an $N_2SA$ or DBP absorption number lower than the lower limit of the range mentioned above tends to have a small reinforcing effect, providing reduced abrasion resistance. A carbon black with an $N_2SA$ or DBP absorption number higher than the upper limit of the range mentioned above tends to have poor dispersibility. The nitrogen adsorption specific surface area is determined in conformity with ASTM D4820-93. The DBP absorption number is determined in conformity with ASTM D2414-93. Examples of commercially available products include those listed in the first aspect of the present invention.

The amount of carbon black per 100 parts by mass of the rubber component is preferably 1 part by mass or more, and more preferably 3 parts by mass or more. Less than 1 part by mass of carbon black may fail to provide sufficient reinforcement. The amount of carbon black is preferably 60 parts by mass or less, more preferably 30 parts by mass or less, and still more preferably 15 parts by mass or less. More than 60 parts by mass of carbon black tends to make the rubber too hard, deteriorating the performance on ice and snow.

Examples of oil include aromatic oil (viscosity-gravity constant (VGC value): 0.900 to 1.049); naphthenic oil (VGC value: 0.850 to 0.899); and paraffinic oil (VGC value: 0.790 to 0.849), with aromatic oil being preferred.

As mentioned above, the myrcene resin is preferably substituted for part or all of the components conventionally added as the softening agent, such as oil. The amount of the myrcene resin based on 100% by mass of total softening agent is preferably 5% by mass or more, more preferably 10% by mass or more, and still more preferably 15% by mass or more. The upper limit thereof may be 100% by mass, and it is preferably 80% by mass or less, and more preferably 50% by mass or less. The total amount of softening agent (including the myrcene resin) per 100 parts by mass of the rubber component is preferably 1 to 100 parts by mass, more preferably 10 to 80 parts by mass, and still more preferably 15 to 60 parts by mass.

Examples of vulcanization accelerators include those listed in the first aspect of the present invention. The amount thereof per 100 parts by mass of the rubber component is preferably 0.1 to 5 parts by mass, and more preferably 0.2 to 3 parts by mass.

The rubber composition according to the second aspect of the present invention may be prepared by any known method; for example, the components are kneaded using a known mixer such as an open roll mill or a Banbury mixer. Regarding the conditions for kneading, additives other than vulcanizing agents and vulcanization accelerators, the kneading temperature is typically 50° C. to 200° C., preferably 80° C. to 190° C., and the kneading time is typically 30 seconds to 30 minutes, preferably 1 to 30 minutes.

For kneading vulcanizing agents and vulcanization accelerators, the kneading temperature is typically 100° C. or lower, and preferably ranges from room temperature to 80° C. A composition containing a vulcanizing agent and/or a vulcanization accelerator is typically vulcanized (e.g. press-vulcanized) before use. The vulcanization temperature is typically 120° C. to 200° C., preferably 140° C. to 180° C.

The rubber composition according to the second aspect of the present invention is used in a tread (cap tread) of a studless winter tire.

The studless winter tire of the second aspect of the present invention can be prepared using the above rubber composition by an ordinary process. Specifically, the rubber composition containing additives as appropriate, before vulcanization, is extruded into a tread shape, formed on a tire building machine in a usual manner, and assembled with other tire components to build an unvulcanized tire. This unvulcanized tire is heat-pressed in a vulcanizer, thereby producing a studless winter tire of the second aspect of the present invention.

The studless winter tire of the second aspect of the present invention can be suitably used as a studless winter tire for passenger automobiles.

EXAMPLES

The present invention will be described in greater detail referring to, but not limited to, examples.

The chemicals used in the preparations are listed below. The chemicals were purified by an ordinary method, if appropriate.

Myrcene: myrcene (myrcene derived from natural resources, Wako Pure Chemical Industries, Ltd.)

Butadiene: 1,3-butadiene (Takachiho Chemical Industrial Co., Ltd.)

Styrene: styrene (Wako Pure Chemical Industries, Ltd.)

Cyclohexane: cyclohexane (guaranteed reagent, Kanto Chemical Co., Inc.)

Neodymium (III) 2-ethylhexanoate: neodymium (III) 2-ethylhexanoate (Wako Pure Chemical Industries, Ltd.)

PMAO: PMAO (polymethylaluminoxane, Tosoh Finechem Corp.)

1M-Diisobutylaluminium hydride: diisobutylaluminium hydride (Tokyo Chemical Industry Co., Ltd.)

1M-Diethylaluminum chloride: diethylaluminum chloride (Tokyo Chemical Industry Co., Ltd.)

Hexane: normal hexane (guaranteed reagent, Kanto Chemical Co., Inc.)

Dibutylhydroxytoluene: dibutylhydroxytoluene (Tokyo Chemical Industry Co., Ltd.)

Isopropanol: isopropanol (guaranteed reagent, Kanto Chemical Co., Inc.)

Methanol: methanol (guaranteed reagent, Kanto Chemical Co., Inc.)

Preparation of Catalyst Solution

To a nitrogen-purged, 50-mL glass vessel were added 8 mL of myrcene in cyclohexane (2.0 mol/L), 1 mL of neodymium (III) 2-ethylhexanoate in cyclohexane (0.2 mol/L), and 8 mL of PMAO (Al: 6.8% by mass), and the mixture was stirred. Five minutes later, 5 mL of 1M diisobutylaluminium hydride in hexane was added thereto. Another five minutes later, 2 mL of 1M diethylaluminum chloride in hexane was added, and the mixture was stirred to obtain a catalyst solution.

Preparation 1 (Synthesis of Myrcene Polymer 1)

A nitrogen-purged, 3-L pressure-resistant stainless steel vessel was charged with 1,800 mL of cyclohexane and 100 g of myrcene, and the mixture was stirred for 10 minutes. Subsequently, 120 mL of the catalyst solution was added thereto, and the resulting mixture was stirred at a constant temperature of 30° C. Three hours later, 10 mL of 0.01M BHT (dibutylhydroxytoluene) in isopropanol was added dropwise to terminate the reaction. The reaction solution was cooled and then added to 3 L of methanol that had been separately prepared. The precipitate thus formed was air-dried overnight, and then further dried under reduced pressure for two days, thereby providing 100 g of a myrcene polymer 1. The polymerization conversion rate ["(final dry weight)/(weight of materials charged)" in percentage] was nearly 100%.

Preparation 2 (Synthesis of Myrcene Polymer 2)

A myrcene polymer 2 (100 g) was formed as in Preparation 1 except that the amount of the catalyst solution was 6 mL.

Preparation 3 (Synthesis of Myrcene Polymer 3)

A myrcene polymer 3 (100 g) was formed as in Preparation 1 except that the amount of the catalyst solution was 0.3 mL.

Preparation 4 (Synthesis of Myrcene Polymer 4)

A myrcene polymer 4 (100 g) was formed as in Preparation 1 except that the amount of the catalyst solution was 0.09 mL.

Preparation 5 (Synthesis of Myrcene-Butadiene Copolymer 1)

A myrcene-butadiene copolymer 1 (100 g) was formed as in Preparation 1 except that the amount of myrcene was 50 g and butadiene (50 g) was added as a monomer together with the myrcene.

Preparation 6 (Synthesis of Myrcene-Butadiene Copolymer 2)

A myrcene-butadiene copolymer 2 (100 g) was formed as in Preparation 5 except that the amount of the catalyst solution was 6 ml.

Preparation 7 (Synthesis of Myrcene-Butadiene Copolymer 3)

A myrcene-butadiene copolymer 3 (100 g) was formed as in Preparation 5 except that the amount of the catalyst solution was 0.3 ml.

Preparation 8 (Synthesis of Myrcene-Butadiene Copolymer 4)

A myrcene-butadiene copolymer 4 (100 g) was formed as in Preparation 5 except that the amount of the catalyst solution was 0.09 ml.

Preparation 9 (Synthesis of Myrcene-Styrene Copolymer 1)

A myrcene-styrene copolymer 1 (100 g) was formed as in Preparation 1 except that the amount of the catalyst solution was 240 ml, the amount of myrcene was 100 g, and styrene (100 g) was added as a monomer together with the myrcene.

Preparation 10 (Synthesis of Myrcene-Styrene Copolymer 2)

A myrcene-styrene copolymer 2 (100 g) was formed as in Preparation 9 except that the amount of the catalyst solution was 6 ml.

Preparation 11 (Synthesis of Myrcene-Styrene Copolymer 3)

A myrcene-styrene copolymer 3 (100 g) was formed as in Preparation 9 except that the amount of the catalyst solution was 0.3 ml.

Preparation 12 (Synthesis of Styrene Polymer)

A styrene polymer (100 g) was formed as in Preparation 9 except that the amount of the catalyst solution was 6 ml, the amount of myrcene was 0 g, and the amount of styrene was 100 g.

The obtained myrcene polymers 1 to 4, myrcene-butadiene copolymers 1 to 4, myrcene-styrene copolymers 1 to 3, and styrene polymer were evaluated as follows.
(Measurement of Weight Average Molecular Weight (Mw))

The Mw was determined using a gel permeation chromatograph (GPC) (GPC-8000 series (Tosoh Corp.); detector: differential refractometer; column: TSKGEL SUPER-MULTIPORE HZ-M (Tosoh Corp.)) relative to polystyrene standards.

The chemicals used in the examples and comparative examples are listed below.
Natural rubber: TSR20
High-cis polybutadiene: UBEPOL BR150B (Ube Industries, Ltd., cis content: 97% by mass)
Silica: Ultrasil VN3-G (Degussa, $N_2SA$: 175 $m^2/g$)
Silane coupling agent: Si69 (Degussa, bis(3-triethoxysilylpropyl)tetrasulfide)
Carbon black: DIABLACK N339 (Mitsubishi Chemical Corp., $N_2SA$: 96 $m^2/g$, DBP absorption number: 124 ml/100 g)
Oil: X-140 (Japan Energy Corp., aromatic oil)
Farnesene polymer 1: KB-101 (KURARAY CO., LTD., Mw: 10,000, melt viscosity: 0.7 Pa·s, Tg: −72° C.)
Farnesene polymer 2: KB-107 (KURARAY CO., LTD., Mw: 135,000, melt viscosity: 69 Pa·s, Tg: −71° C.)
Farnesene-styrene copolymer 1: FSR-221 (KURARAY CO., LTD., Mw: 10,000, copolymerization ratio (by mass): farnesene/styrene=77/23, melt viscosity: 5.7 Pa·s, Tg: −54° C.)
Farnesene-styrene copolymer 2: FSR-242 (KURARAY CO., LTD., Mw: 10,000, copolymerization ratio (by mass): farnesene/styrene=60/40, melt viscosity: 59.2 Pa·s, Tg: −35° C.)
Farnesene-butadiene copolymer 1: FBR-746 (KURARAY CO., LTD., Mw: 100,000, copolymerization ratio (by mass): farnesene/butadiene=60/40, melt viscosity: 603 Pa·s, Tg: −78° C.)
Farnesene-butadiene copolymer 2: FB-823 (KURARAY CO., LTD., Mw: 50,000, copolymerization ratio (by mass): farnesene/butadiene=80/20, melt viscosity: 13 Pa·s, Tg=−78° C.)
Myrcene polymer 1: see Preparation 1 (weight average molecular weight: 500)
Myrcene polymer 2: see Preparation 2 (weight average molecular weight: 10,000)
Myrcene polymer 3: see Preparation 3 (weight average molecular weight: 200,000)
Myrcene polymer 4: see Preparation 4 (weight average molecular weight: 650,000)
Myrcene-butadiene copolymer 1: see Preparation 5 (weight average molecular weight: 500, myrcene/butadiene (ratio by mass)=50/50)
Myrcene-butadiene copolymer 2: see Preparation 6 (weight average molecular weight: 10,000, myrcene/butadiene (ratio by mass)=50/50)
Myrcene-butadiene copolymer 3: see Preparation 7 (weight average molecular weight: 200,000, myrcene/butadiene (ratio by mass)=50/50)
Myrcene-butadiene copolymer 4: see Preparation 8 (weight average molecular weight: 650,000, myrcene/butadiene (ratio by mass)=50/50)
Myrcene-styrene copolymer 1: see Preparation 9 (weight average molecular weight: 250, myrcene/styrene (ratio by mass)=50/50)
Myrcene-styrene copolymer 2: see Preparation 10 (weight average molecular weight: 10,000, myrcene/styrene (ratio by mass)=50/50)
Myrcene-styrene copolymer 3: see Preparation 11 (weight average molecular weight: 200,000, myrcene/styrene (ratio by mass)=50/50)
Styrene polymer: see Preparation 12 (weight average molecular weight: 10,000)
Antioxidant: Antigene 3C (Sumitomo Chemical Co., Ltd.)
Stearic acid:stearic acid beads "Tsubaki" (NOF Corp.)
Zinc oxide: zinc oxide #1 (Mitsui Mining & Smelting Co., Ltd.)
Wax: SUNNOC N (Ouchi Shinko Chemical Industrial Co., Ltd.)
Sulfur: powdered sulfur (Tsurumi Chemical Industry Co., Ltd.)
Vulcanization accelerator 1: SOXINOL CZ (Sumitomo Chemical Co., Ltd.)
Vulcanization accelerator 2: SOXINOL D (Sumitomo Chemical Co., Ltd.)

Examples and Comparative Examples

Based on each of the formulations shown in Table 1, the materials other than the sulfur and vulcanization accelerators were kneaded for five minutes at 150° C. using a 1.7-L Banbury mixer (Kobe Steel, Ltd.) to give a kneaded mixture. The sulfur and vulcanization accelerators were added to the kneaded mixture, and the mixture was kneaded for five minutes at 80° C. using an open roll mill, providing an unvulcanized rubber composition. The unvulcanized rubber composition was formed into a tread shape and then assembled with other tire components on a tire building machine to build an unvulcanized tire. The unvulcanized tire was vulcanized for 12 minutes at 170° C., thereby providing a test tire (size: 195/65R15).

The test tires thus obtained were evaluated as follows. Tables 1 to 6 show the results.

<Blackness>

The test tires were left exposed to 50 pphm ozone at 40° C. for one week. Then, the blackness of each tire was measured using a colorimeter, and the discoloration (turning white or brown) on the tire surface was rated as follows.

5: No discoloration
4: Slight discoloration
3: Less than half of the whole tire surface discolored
2: Half or more of the whole tire surface discolored
1: Overall discoloration <Hardness Change Index>

The test tires were left exposed to 50 pphm ozone at 40° C. for one week. Then, the hardness (JIS-A) of the tread part of each tire was measured. Those having a hardness change index of 95 to 105 are rated as good. The hardness change index is defined as follows:

(Hardness change index)=(Hardness after exposure)/(Hardness before exposure)×100.

<Steering Performance Index>

The test tires were mounted on the wheels of a Japan-made 2000-cc FF (front engine front wheel drive) vehicle, and the vehicle was driven on ice and snow covered roads under the following conditions. The starting, acceleration, and stopping were sensorily evaluated. The sensory evaluation was performed using a scoring method as follows. When compared to the performance of Comparative Example 1 (=100), for example, those with a rating of "clearly improved performance" from a test driver are given a score of 120; and those with a rating of "high performance at a level as never before" are given a score of 140.

|  | (On ice) | (On snow) |
|---|---|---|
| Place: | Nayoro test course, Hokkaido | ← |
| Temperature: | −1° C. to −6° C. | −2° C. to −10° C. |

<On-Ice Braking Performance Index>

The vehicle was driven on an icy road, and the vehicle was braked at 30 km/h until the brakes locked up to measure the distance the vehicle required until it stopped (on-ice brake stopping distance). This distance is expressed as an index using the following equation. A higher index indicates better grip performance on ice.

(On-ice braking performance index)=(On-ice brake stopping distance of Comparative Example 1)/(On-ice brake stopping distance of each formulation)×100

<Abrasion Resistance Index>

The test tires were mounted on the wheels of a Japan-made FF (front engine front wheel drive) vehicle. The vehicle was driven 8,000 km, and then the groove depth of the tire tread part was measured. The driving distance at which the tire groove depth decreased by 1 mm was calculated and expressed as an index using the following equation. A higher index indicates better abrasion resistance.

(Abrasion resistance index)=(Driving distance of each formulation)/(Driving distance of Comparative Example 1)×100

TABLE 1

|  |  | Examples |  |  |  |  |  | Comparative Examples |  |  |  |  |
|---|---|---|---|---|---|---|---|---|---|---|---|---|
|  |  | 1 | 2 | 3 | 4 | 5 | 6 | 1 | 2 | 3 | 4 | 5 |
| Composition (part(s) by mass) | Natural rubber | 50 | 50 | 40 | 40 | 60 | 60 | 50 | 50 | 50 | 50 | 50 |
|  | High-cis polybutadiene | 50 | 50 | 60 | 60 | 40 | 40 | 50 | 50 | 50 | 50 | 50 |
|  | Silica | 75 | 75 | 75 | 75 | 75 | 75 | 75 | 75 | 75 | 75 | 75 |
|  | Silane coupling agent | 6 | 6 | 6 | 6 | 6 | 6 | 6 | 6 | 6 | 6 | 6 |
|  | Carbon black | 5 | 5 | 5 | 5 | 5 | 5 | 5 | 5 | 5 | 5 | 5 |
|  | Oil | 35 | 35 | 35 | 35 | 35 | 35 | 45 | 44.8 | 44.8 | — | — |
|  | Farnesene polymer 1 | 10 | — | 10 | — | 10 | — | — | 0.2 | — | 55 | — |
|  | Farnesene polymer 2 | — | 10 | — | 10 | — | 10 | — | — | 0.2 | — | 55 |
|  | Antioxidant | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Blackness | 4 | 4 | 4 | 4 | 4 | 4 | 2 | 2 | 2 | 2 | 2 |
|  | Hardness change index | 104 | 102 | 103 | 102 | 103 | 101 | 111 | 110 | 110 | 101 | 106 |
|  | Steering performance index | 108 | 113 | 103 | 108 | 113 | 118 | 100 | 100 | 100 | 80 | 90 |
|  | On-ice braking performance index | 104 | 101 | 109 | 104 | 103 | 100 | 100 | 100 | 100 | 105 | 102 |
|  | Abrasion resistance index | 110 | 106 | 115 | 109 | 105 | 102 | 100 | 100 | 100 | 75 | 78 |

TABLE 2

|  |  | Examples |  |  |  |  |  | Comparative Examples |  |  |  |  |
|---|---|---|---|---|---|---|---|---|---|---|---|---|
|  |  | 7 | 8 | 9 | 10 | 11 | 12 | 1 | 6 | 7 | 8 | 9 |
| Composition (part(s) by mass) | Natural rubber | 50 | 50 | 40 | 40 | 60 | 60 | 50 | 50 | 50 | 50 | 50 |
|  | High-cis polybutadiene | 50 | 50 | 60 | 60 | 40 | 40 | 50 | 50 | 50 | 50 | 50 |
|  | Silica | 75 | 75 | 75 | 75 | 75 | 75 | 75 | 75 | 75 | 75 | 75 |

TABLE 2-continued

|  |  | Examples | | | | | | Comparative Examples | | | | |
|---|---|---|---|---|---|---|---|---|---|---|---|---|
|  |  | 7 | 8 | 9 | 10 | 11 | 12 | 1 | 6 | 7 | 8 | 9 |
|  | Silane coupling agent | 6 | 6 | 6 | 6 | 6 | 6 | 6 | 6 | 6 | 6 | 6 |
|  | Carbon black | 5 | 5 | 5 | 5 | 5 | 5 | 5 | 5 | 5 | 5 | 5 |
|  | Oil | 35 | 35 | 35 | 35 | 35 | 35 | 45 | 44.8 | 44.8 | — | — |
|  | Farnesene-styrene copolymer 1 | 10 | — | 10 | — | 10 | — | — | 0.2 | — | 55 | — |
|  | Farnesene-styrene copolymer 2 | — | 10 | — | 10 | — | 10 | — | — | 0.2 | — | 55 |
|  | Antioxidant | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Blackness | 4 | 4 | 4 | 4 | 4 | 4 | 2 | 2 | 2 | 2 | 2 |
|  | Hardness change index | 105 | 103 | 104 | 103 | 104 | 102 | 111 | 110 | 110 | 101 | 106 |
|  | Steering performance index | 111 | 116 | 106 | 111 | 116 | 121 | 100 | 100 | 100 | 80 | 90 |
|  | On-ice braking performance index | 104 | 101 | 109 | 104 | 103 | 100 | 100 | 100 | 100 | 105 | 102 |
|  | Abrasion resistance index | 110 | 106 | 115 | 109 | 105 | 102 | 100 | 100 | 100 | 75 | 78 |

TABLE 3

|  |  | Examples | | | | | | | | Comparative Examples | | | | |
|---|---|---|---|---|---|---|---|---|---|---|---|---|---|---|
|  |  | 13 | 14 | 15 | 16 | 17 | 18 | 19 | 20 | 1 | 10 | 11 | 12 | 13 |
| Composition (part(s) by mass) | Natural rubber | 50 | 50 | 40 | 40 | 60 | 60 | 50 | 50 | 50 | 50 | 50 | 50 | 50 |
|  | High-cis polybutadiene | 50 | 50 | 60 | 60 | 40 | 40 | 50 | 50 | 50 | 50 | 50 | 50 | 50 |
|  | Silica | 75 | 75 | 75 | 75 | 75 | 75 | 75 | 75 | 75 | 75 | 75 | 75 | 75 |
|  | Silane coupling agent | 6 | 6 | 6 | 6 | 6 | 6 | 6 | 6 | 6 | 6 | 6 | 6 | 6 |
|  | Carbon black | 5 | 5 | 5 | 5 | 5 | 5 | 5 | 5 | 5 | 5 | 5 | 5 | 5 |
|  | Oil | 35 | 35 | 35 | 35 | 35 | 35 | 15 | 15 | 45 | 44.8 | 44.8 | — | — |
|  | Farnesene-butadiene copolymer 1 | 10 | — | 10 | — | 10 | — | 30 | — | — | 0.2 | — | 55 | — |
|  | Farnesene-butadiene copolymer 2 | — | 10 | — | 10 | — | 10 | — | 30 | — | — | 0.2 | — | 55 |
|  | Antioxidant | 1.5 | 1.5 | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Blackness | 4 | 4 | 4 | 4 | 4 | 4 | 4 | 4 | 2 | 2 | 2 | 2 | 2 |
|  | Hardness change index | 103 | 102 | 103 | 102 | 103 | 103 | 101 | 101 | 111 | 110 | 110 | 101 | 106 |
|  | Steering performance index | 106 | 108 | 104 | 105 | 110 | 113 | 102 | 100 | 100 | 100 | 100 | 75 | 85 |
|  | On-ice braking performance index | 109 | 108 | 111 | 110 | 106 | 103 | 117 | 115 | 100 | 100 | 100 | 125 | 121 |
|  | Abrasion resistance index | 113 | 106 | 115 | 111 | 107 | 104 | 115 | 113 | 100 | 100 | 100 | 85 | 80 |

TABLE 4

|  |  | Examples | | | | | | Comparative Examples | | | | | | | | | | |
|---|---|---|---|---|---|---|---|---|---|---|---|---|---|---|---|---|---|
|  |  | 21 | 22 | 23 | 24 | 25 | 26 | 1 | 14 | 15 | 16 | 17 | 18 | 19 | 20 | 21 | 22 | 23 |
| Composition (part(s) by mass) | Natural rubber | 50 | 50 | 40 | 40 | 60 | 60 | 50 | 50 | 50 | 50 | 50 | 50 | 50 | 50 | 50 | 90 | 10 |
|  | High-cis poly-butadiene | 50 | 50 | 60 | 60 | 40 | 40 | 50 | 50 | 50 | 50 | 50 | 50 | 50 | 50 | 50 | 10 | 90 |
|  | Silica | 75 | 75 | 75 | 75 | 75 | 75 | 75 | 75 | 75 | 75 | 75 | 75 | 75 | 5 | 160 | 75 | 75 |
|  | Silane coupling agent | 6 | 6 | 6 | 6 | 6 | 6 | 6 | 6 | 6 | 6 | 6 | 6 | 6 | 0.4 | 12.8 | 6 | 6 |
|  | Carbon black | 5 | 5 | 5 | 5 | 5 | 5 | 5 | 5 | 5 | 5 | 5 | 5 | 5 | 5 | 5 | 5 | 5 |
|  | Oil | 35 | 35 | 35 | 35 | 35 | 35 | 45 | 44.5 | 44.5 | — | — | 35 | 35 | 35 | 35 | 35 | 35 |
|  | Myrcene polymer 1 | — | — | — | — | — | — | — | — | — | — | — | — | 10 | — | — | — | — |
|  | Myrcene polymer 2 | 10 | — | 10 | — | 10 | — | — | 0.5 | — | 55 | — | — | — | 10 | 10 | 10 | 10 |

TABLE 4-continued

|  |  | Examples |  |  |  |  |  | Comparative Examples |  |  |  |  |  |  |  |  |  |  |
|---|---|---|---|---|---|---|---|---|---|---|---|---|---|---|---|---|---|---|
|  |  | 21 | 22 | 23 | 24 | 25 | 26 | 1 | 14 | 15 | 16 | 17 | 18 | 19 | 20 | 21 | 22 | 23 |
|  | Myrcene polymer 3 | — | 10 | — | 10 | — | 10 | — | — | 0.5 | — | 55 | — | — | — | — | — | — |
|  | Myrcene polymer 4 | — | — | — | — | — | — | — | — | — | — | — | 10 | — | — | — | — | — |
|  | Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Blackness | 4 | 4 | 4 | 4 | 4 | 4 | 2 | 2 | 2 | 2 | 2 | 4 | 3 | 4 | 5 | 4 | 4 |
|  | Hardness change index | 105 | 103 | 104 | 103 | 104 | 102 | 111 | 110 | 110 | 101 | 108 | 110 | 102 | 115 | 110 | 108 | 105 |
|  | Steering performance index | 105 | 110 | 100 | 105 | 110 | 115 | 100 | 100 | 100 | 80 | 90 | 100 | 95 | 70 | 60 | 90 | 80 |
|  | On-ice braking performance index | 103 | 101 | 108 | 104 | 102 | 100 | 100 | 100 | 100 | 105 | 102 | 90 | 105 | 100 | 70 | 86 | 110 |
|  | Abrasion resistance index | 110 | 107 | 115 | 110 | 105 | 103 | 100 | 100 | 100 | 75 | 78 | 105 | 65 | 55 | 105 | 84 | 135 |

TABLE 5

|  |  | Examples |  |  |  |  |  | Comparative Examples |  |  |  |  |  |  |  |  |  |  |
|---|---|---|---|---|---|---|---|---|---|---|---|---|---|---|---|---|---|---|
|  |  | 27 | 28 | 29 | 30 | 31 | 32 | 1 | 24 | 25 | 26 | 27 | 28 | 29 | 30 | 31 | 32 | 33 |
| Composition (part(s) by mass) | Natural rubber | 50 | 50 | 40 | 40 | 60 | 60 | 50 | 50 | 50 | 50 | 50 | 50 | 50 | 50 | 50 | 90 | 10 |
|  | High-cis polybutadiene | 50 | 50 | 60 | 60 | 40 | 40 | 50 | 50 | 50 | 50 | 50 | 50 | 50 | 50 | 50 | 10 | 90 |
|  | Silica | 75 | 75 | 75 | 75 | 75 | 75 | 75 | 75 | 75 | 75 | 75 | 75 | 75 | 5 | 160 | 75 | 75 |
|  | Silane coupling agent | 6 | 6 | 6 | 6 | 6 | 6 | 6 | 6 | 6 | 6 | 6 | 6 | 6 | 0.4 | 12.8 | 6 | 6 |
|  | Carbon black | 5 | 5 | 5 | 5 | 5 | 5 | 5 | 5 | 5 | 5 | 5 | 5 | 5 | 5 | 5 | 5 | 5 |
|  | Oil | 35 | 35 | 35 | 35 | 35 | 35 | 45 | 44.5 | 44.5 | — | — | 35 | 35 | 35 | 35 | 35 | 35 |
|  | Myrcene-butadiene co-polymer 1 | — | — | — | — | — | — | — | — | — | — | — | — | 10 | — | — | — | — |
|  | Myrcene-butadiene co-polymer 2 | 10 | — | 10 | — | 10 | — | — | 0.5 | — | 55 | — | — | 10 | 10 | 10 | 10 |
|  | Myrcene-butadiene co-polymer 3 | — | 10 | — | 10 | — | 10 | — | — | 0.5 | — | 55 | — | — | — | — | — | — |
|  | Myrcene-butadiene co-polymer 4 | — | — | — | — | — | — | — | — | — | — | — | 10 | — | — | — | — | — |
|  | Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Blackness | 4 | 4 | 4 | 4 | 4 | 4 | 2 | 2 | 2 | 2 | 2 | 4 | 3 | 4 | 5 | 4 | 4 |
|  | Hardness change index | 102 | 100 | 101 | 100 | 101 | 100 | 111 | 107 | 107 | 100 | 105 | 107 | 101 | 112 | 107 | 105 | 102 |
|  | Steering performance index | 114 | 119 | 110 | 114 | 119 | 124 | 100 | 100 | 100 | 82 | 91 | 99 | 95 | 73 | 64 | 91 | 82 |

TABLE 5-continued

|  | | Examples | | | | | | Comparative Examples | | | | | | | | | |
| --- | --- | --- | --- | --- | --- | --- | --- | --- | --- | --- | --- | --- | --- | --- | --- | --- |
|  | | 27 | 28 | 29 | 30 | 31 | 32 | 1 | 24 | 25 | 26 | 27 | 28 | 29 | 30 | 31 | 32 | 33 |
| On-ice braking performance index | | 106 | 106 | 113 | 109 | 107 | 105 | 100 | 100 | 100 | 105 | 102 | 96 | 105 | 100 | 70 | 86 | 110 |
| Abrasion resistance index | | 125 | 122 | 129 | 125 | 120 | 118 | 100 | 100 | 100 | 92 | 95 | 120 | 83 | 63 | 107 | 89 | 142 |

TABLE 6

|  |  | Examples | | | Comparative Examples | | | | | | | | | |
| --- | --- | --- | --- | --- | --- | --- | --- | --- | --- | --- | --- | --- | --- | --- |
|  |  | 33 | 34 | 35 | 1 | 34 | 35 | 36 | 37 | 38 | 39 | 40 | 41 | 42 |
| Composition (part(s) by mass) | Natural rubber | 50 | 40 | 60 | 50 | 50 | 50 | 50 | 50 | 50 | 50 | 50 | 90 | 10 |
|  | High-cis polybutadiene | 50 | 60 | 40 | 50 | 50 | 50 | 50 | 50 | 50 | 50 | 50 | 10 | 90 |
|  | Silica | 75 | 75 | 75 | 75 | 75 | 75 | 75 | 75 | 75 | 5 | 160 | 75 | 75 |
|  | Silane coupling agent | 6 | 6 | 6 | 6 | 6 | 6 | 6 | 6 | 6 | 0.4 | 12.8 | 6 | 6 |
|  | Carbon black | 5 | 5 | 5 | 5 | 5 | 5 | 5 | 5 | 5 | 5 | 5 | 5 | 5 |
|  | Oil | 35 | 35 | 35 | 45 | 35 | 35 | 35 | 44.5 | — | 35 | 35 | 35 | 35 |
|  | Myrcene-styrene copolymer 1 | — | — | — | — | — | 10 | — | — | — | — | — | — | — |
|  | Myrcene-styrene copolymer 2 | 10 | 10 | 10 | — | — | — | — | 0.5 | 55 | 10 | 10 | 10 | 10 |
|  | Myrcene-styrene copolymer 3 | — | — | — | — | — | — | 10 | — | — | — | — | — | — |
|  | Styrene polymer | — | — | — | — | 10 | — | — | — | — | — | — | — | — |
|  | Antioxidant | 1.5 | 1.5 | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Blackness | 4 | 4 | 4 | 2 | 3 | 3 | 4 | 2 | 2 | 4 | 5 | 4 | 4 |
|  | Hardness change index | 101 | 101 | 102 | 111 | 101 | 104 | 103 | 107 | 100 | 112 | 107 | 105 | 102 |
|  | Steering performance index | 119 | 115 | 124 | 100 | 109 | 99 | 120 | 100 | 82 | 75 | 67 | 93 | 87 |
|  | On-ice braking performance index | 108 | 115 | 109 | 100 | 86 | 105 | 96 | 100 | 105 | 98 | 68 | 86 | 109 |
|  | Abrasion resistance index | 115 | 119 | 110 | 100 | 92 | 86 | 110 | 102 | 82 | 62 | 106 | 87 | 137 |

Tables 1 to 3 show that the rubber compositions of the examples, which contained a predetermined amount of a farnesene resin, provided both improved performance on ice and snow and improved abrasion resistance, and, at the same time, suppressed changes in hardness and discoloration on the tire surface.

Tables 4 to 6 show that in the examples in which a predetermined amount of a specific myrcene resin having a weight average molecular weight within a predetermined range was added in a rubber composition containing predetermined amounts of a high-cis polybutadiene having a cis content within a predetermined range, and a silica having a nitrogen adsorption specific surface area within a predetermined range, the performance on ice and snow and the abrasion resistance were both improved, and, at the same time, the changes in hardness and the discoloration on the tire surface were suppressed. The addition of a myrcene-butadiene copolymer or a myrcene-styrene copolymer as the myrcene resin provided particularly excellent performance properties.

The invention claimed is:
1. A studless winter tire, said tire comprising:
a tread formed from a rubber composition,
the rubber composition comprising, per 100 parts by mass of a rubber component, 1 to 50 parts by mass of a farnesene resin obtained by polymerizing farnesene,
wherein the rubber component is at least one selected from the group consisting of natural rubber, isoprene rubber, butadiene rubber, and styrene-butadiene rubber, and
the farnesene resin has a weight average molecular weight of 1,000 to 500,000.
2. The studless winter tire according to claim 1, wherein the farnesene resin is a polymer of farnesene.
3. The studless winter tire according to claim 2, wherein the polymer has a glass transition temperature of −60° C. or lower.
4. The studless winter tire according to claim 2, wherein the polymer has a weight average molecular weight of 3,000 to 500,000.
5. The studless winter tire according to claim 1, wherein the farnesene resin is a copolymer of farnesene and a vinyl monomer.
6. The studless winter tire according to claim 5, wherein the vinyl monomer is styrene.
7. The studless winter tire according to claim 5, wherein the vinyl monomer is butadiene.
8. The studless winter tire according to claim 5, wherein the copolymer has a farnesene/vinyl monomer copolymerization ratio of 99/1 to 25/75 by mass.
9. The studless winter tire according to claim 5, wherein the copolymer has a weight average molecular weight of 3,000 to 500,000.

10. The studless winter tire according to claim 5, wherein the copolymer has a melt viscosity at 38° C. of 1,000 Pa·s or lower.

11. The studless winter tire according to claim 1, wherein the farnesene is prepared by culturing a microorganism using a carbon source derived from a saccharide.

12. The studless winter tire according to claim 1, wherein the rubber composition comprises, per 100 parts by mass of the rubber component, 10 to 150 parts by mass of a silica having a nitrogen adsorption specific surface area of 40 to 400 m$^2$/g.

13. The studless winter tire according to claim 1, wherein the rubber component comprises, based on 100% by mass of the rubber component, 15 to 65% by mass of a high-cis polybutadiene having a cis-content of 95% by mass or more.

\* \* \* \* \*